Figure 1:
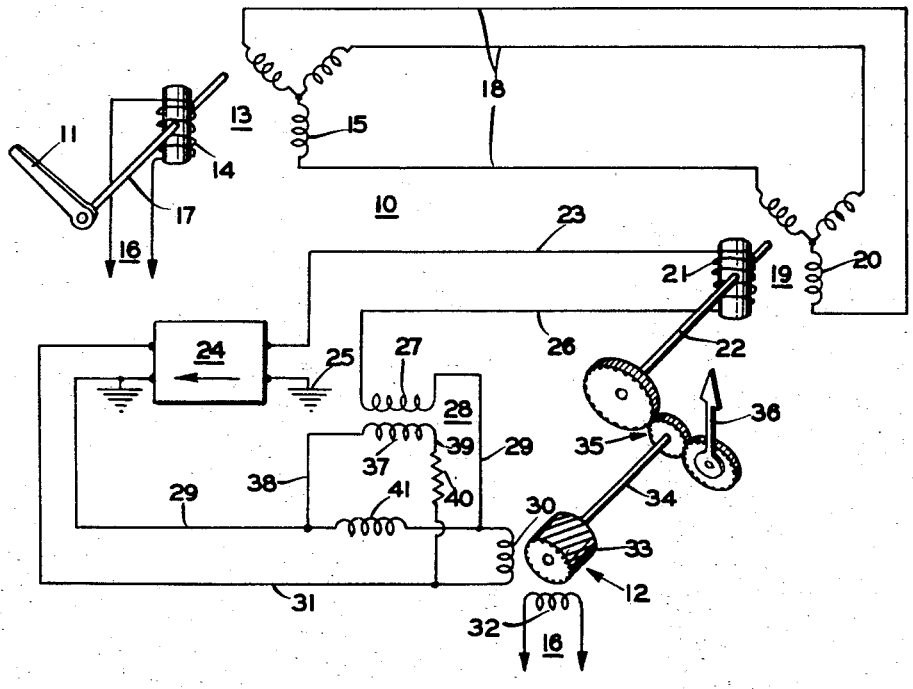

Jan. 3, 1950  J. D. PETERSON  2,493,593
DAMPED SERVO SYSTEM
Filed Jan. 2, 1948

INVENTOR.
JOEL D. PETERSON
BY
— ATTORNEY —

Patented Jan. 3, 1950

2,493,593

UNITED STATES PATENT OFFICE 2,493,593

DAMPED SERVO SYSTEM

Joel D. Peterson, Ridgewood, N. J., assignor to Bendix Aviation Corporation, Teterboro, N. J., a corporation of Delaware Application January 2, 1948, Serial No. 270

9 Claims. (Cl. 318—30)

This invention relates to a control circuit for a servomotor, and more particularly to a control circuit for stabilizing the operation of the servomotor to prevent oscillations or hunting of the motor about the null or synchronous position determined by a controlling object.

In self-synchronous systems employing a motor to position an object in accordance with the position of a controlling object located at a remote point, the natural tendency of the controlled motor is to oscillate about the null position determined by the displacement signal of the controlling object due to the momentum of the motor and of the controlled object. Various expedients have been proposed to eliminate, or reduce to a minimum the hunting tendencies of such systems. Rate generators have been proposed, coupled to the servomotor for developing a signal voltage responsive to the speed of the servomotor. The rate signal thus derived was fed back into the system to modify the displacement signals of the controlling object to reduce the speed of the servomotor in response to the displacement signal to reduce the overshoot of the motor and its consequent hunting about the null position. Electrical networks including capacity-resistance time elements, and voltage dividers have also been proposed whereby voltage signals responsive to rate and/or acceleration are obtained from the displacement signal. These derivative signals were likewise used to modify the displacement signals for reducing the oscillation tendencies of the systems.

It is an object of my present invention to provide a control circuit for stabilizing the operation of a servomotor in which the change in impedance of the servomotor due to its operational speed in response to displacement signals is used as a means for obtaining rate signal voltages for damping the oscillations of the motor.

A further object of my invention is to provide a control circuit for a servomotor in which portions of the voltage applied to and the current in the servomotor circuit modify the displacement signals to damp the oscillations of the motor.

Another object of my invention is to provide a control circuit of the character indicated wherein the rate signals obtained are applied by a feedback circuit to a thermionic circuit for modifying the displacement error signal applied to the amplifier.

Still another object of the invention is to provide a novel control circuit of the character indicated which shall consist of few and simple circuit elements having no critical adjustments, which shall be relatively inexpensive to manufacture, positive in its action, which shall have a large variety of applications and yet be practical and efficient to a high degree in use.

Other objects of this invention will in part be obvious, and in part hereinafter pointed out.

Figure 2:
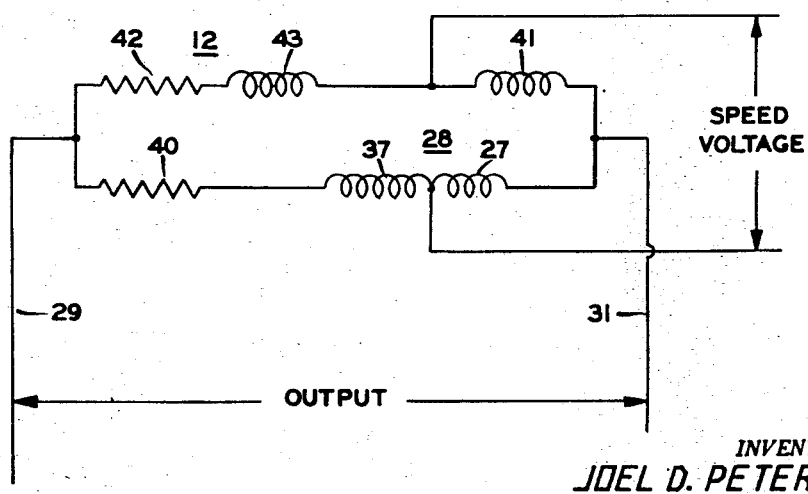

In the accompanying drawings forming a part of this specification in which one of the various possible illustrative embodiments of this invention is shown, and wherein the same reference characters designate corresponding elements throughout the two views, Fig. 1 is a schematic wiring diagram of a circuit for controlling servomotor of a self-synchronous follow-up system, while Fig. 2 is the equivalent circuit of the electrical elements of Fig. 1.

Referring now to Fig. 1 of the drawings, the numeral 10 designates a control circuit embodying my invention in which a control lever 11 acting as the controlling body controls the operation of a two phase induction motor 12.

The control circuit 10 includes a signal generator or transmitter 13 having a single phase rotor winding 14 and a three phase stator winding 15. The rotor winding 14 is connected across a suitable source of alternating current 16 and is adapted to be angularly displaced with respect to the stator 15 by means of the control handle 11 mounted on a shaft 17 together with said rotor. The stator winding 15 is connected by suitable leads 18 to a control transformer or receiver 19. The receiver 19 comprises a three phase secondary or stator winding 20 to which the transmitter stator is connected, and a primary or rotor winding 21 mounted on a shaft 22.

As is well known in the art, the alternating current in the rotor winding 14 of the transmitter 13 will induce a voltage in the three phase stator winding 15. This induced displacement voltage will be impressed on the receiver winding 20 which in turn will induce an error voltage in the winding 21 depending upon the relative positions of the rotor and stator windings of the transmitter and receiver. When the angular position of the receiver rotor with respect to the stator is the same as that of the transmitter rotor to its stator, no voltage is induced in rotor 21. The system is in electrical equilibrium and rotor 21 is in the null or synchronous position. When the positions of the transmitter and receiver elements are not the same, an error signal voltage is induced in the receiver winding 21 which is a measure of the relative angular displacement of the elements. The servomotor 12, as hereinafter described, will be driven by the error signal thus induced, to position the rotor 21 to the null or synchronous position.

Means is now provided in the circuit 10 for operating the motor 12 in response to the error signals for positioning the rotor 21 to a null position without overshooting or oscillating about the synchronous position.

To this end, one end of rotor winding 21 is connected by lead 23 to the input side of a conventional electronic amplifier 24, the other amplifier input side being grounded, as at 25. The other end of rotor winding 21 is grounded by lead 26 through the secondary winding 27 of a transformer 28 and a grounded lead 29 connected to an output side of amplifier 24. The lead 29 also connects one side of the variable phase 30 of the induction motor 12 to the output of amplifier 24, while a lead 31 connects the other side of the phase 30 to the other amplifier output side.

The fixed phase 32 of the induction motor 12 is connected across the power supply 16, while the rotor 33 thereof having a shaft 34, is geared through the reduction gearing shown generally at 35, to the receiver rotor shaft 22 and to a pointer 36.

The circuit thus far described will operate in the well known manner. The error signal due to the disagreement of rotors 14 and 21 will be amplified by the electronic circuit 24 and applied to the variable phase 30. The induction motor 12 will be operated to drive the receiver rotor 21 into positional agreement with that of rotor 14 through the reduction gearing 35. The motor 12 will be stopped when rotor 21 is in the null or synchronous position.

Means is now provided to impress rate signal voltages across the amplifier input leads 23, 25 for damping the oscillations of motor 12 and insure dead-beat operation thereof with the controlling object 11.

To this end, the primary winding 37 of transformer 28 is connected by lead 38 to grounded lead 29, and by lead 39 through a resistor 40 to the lead 31. Connected in series with the variable phase 30 in lead 29 is an inductance element 41. The voltage applied to the phase 30 will be impressed across the primary winding 37 through the resistor 40. This voltage will induce a voltage in the secondary winding 27 which is impressed on the input side of the amplifier 24. A current feedback circuit is also provided by the inductance 41 connected into the lead 29, the voltage drop across the inductance due to the current drawn by the motor is in series with the transformer secondary voltage and the error signal.

In Fig. 2 I have shown the hereinabove described circuit in its equivalent form which will be recognized as being an impedance bridge of the Wheatstone type. The impedance of the motor 12 is in its equivalent form and comprises a resistor 42 and an inductive impedance 43, connected in series with the inductive impedance 41. The transformer 28 acts as an auto-transformer and is so shown connected in series with the resistor 40. The resistance 40 and the inductance 41 are so adjusted that when the motor 12 is stalled with power applied to the variable phase 30, the transformer secondary voltage is equal to and in phase with the voltage drop across the inductance 41. Under these conditions the bridge circuit is balanced.

As is well known, the impedance of the motor increases as the speed of the motor increases. It is this change in motor impedance which determines the value of the desired speed voltage which is applied to the input of the amplifier to stabilize the system described. As the motor impedance increases, the current decreases and the voltage applied to the motor increases due to the internal impedance of the amplifier. The changes in the voltage output of the amplifier will increase the voltage drop across the inductance 41, changing the voltage balance previously had between the drop across the inductance 41 and the induced voltage in the transformer secondary 27. The voltage drops across these two elements are now no longer equal, the difference between the two voltages being equivalent to a speed voltage. This speed voltage which is responsive to the voltage impressed across the motor and the current drawn, is impressed on the amplifier input in series with the error voltage, the total input to the amplifier being proportional to the position error plus a rate of change in position. Thus, for any given motor speed in response to the error signal, the voltage and current feedback circuit hereby provided effectively damps the oscillations of the servomotor.

If due to inertia or load effects, the motor is rotating in a direction opposite to that of the torque due to the applied voltage, the impedance of the motor will decrease and be less than that found for stall conditions. The effect of this condition on the circuit will produce a positive signal which will increase the amplifier voltage tending to produce a higher motor torque. The motor will therefore be driven in the proper direction to bring about a synchronous or null condition of the receiver and transmitter.

It will thus be seen that there is provided a damping circuit for a servomotor in which the several objects of this invention are achieved and which is well adapted to meet the conditions of practical use.

As various possible embodiments might be made of the above invention, and as various changes might be made in the embodiment set forth, it is to be understood that all matter herein set forth or shown in the accompanying drawing, is to be interpreted as illustrative and not in a limiting sense.

Having thus described my invention, I claim as new and desire to secure by Letters Patent:

1. A servomotor control comprising a controlling element, a controlled element, means for developing a signal voltage upon displacement of said controlling element, a receiver adapted to develop an error signal in response to the displacement signal, and a servomotor to drive said receiver and said controlled element into positional agreement with said controlling element in response to the error signal; a transformer having its primary winding connected in parallel with said motor and its secondary winding connected in series with said receiver and an impedance in series with said secondary winding to provide a voltage proportional to the speed of said motor to damp the oscillations of said motor about the null position of said receiver.

2. A servomotor control comprising a controlling element, a controlled element, means for developing a signal voltage upon displacement of said controlling element, a receiver adapted to develop an error signal in response to the displacement signal, and a servomotor to drive said receiver and said controlled element into positional agreement with said controlling element in response to the error signal; a resistor, and a transformer having its primary winding connected in series with said resistor and in parallel with said motor and its secondary winding connected in series with said receiver, and an inductive impedance in series with said secondary winding to provide a voltage proportional to the speed of said motor to damp the oscillations of said motor about the null position of said receiver.

3. A servomotor control comprising a controlling element, a controlled element, means for developing a signal voltage upon displacement of said controlling element, a receiver adapted to develop an error signal in response to the displacement signal, and a servomotor having an energized phase and a variable phase adapted to be energized by the error signal voltage to operate said motor to drive said receiver and said controlled element into positional agreement with said controlling element, a resistor, and a transformer having its primary winding connected in series with said resistor and in parallel with the variable phase of said motor and its secondary winding connected in series with said receiver, an inductive impedance in series with the secondary winding to provide a feedback voltage proportional to the speed of said motor in series with the error signal voltage to damp the oscillations of said motor about the null position of said receiver.

4. A servomotor control comprising a controlling element, a controlled element, means for developing a signal voltage upon displacement of said controlling element, a receiver adapted to develop an error signal in response to the displacement signals, an amplifier, the error signal voltage forming the input of said amplifier, and a servomotor having an energized phase, and a variable phase connected to the output of said amplifier to operate said motor in response to the error voltage to drive said controlled element and said receiver into positional agreement with said controlling element; a resistor, a transformer having its primary winding connected in series with said resistor and in parallel with the variable phase of said motor, and its secondary winding connected in series with said receiver; an inductive impedance in series with the variable phase of said motor, to provide a feedback voltage proportional to the speed of said motor in series with the error signal voltage to the input of said amplifier to damp the oscillations of said motor about the null position of said receiver.

5. In a servomotor control for positioning a controlled object in accordance with the position of a controlling object in response to signal voltages, the combination comprising means for providing a measure of the voltage applied to said motor, and means for providing a measure of the current drawn by said motor due to the changes in motor impedance upon changes in the operational speed thereof, both of said means forming feedback circuits in series with the signal voltages to damp the oscillations of said motor about the synchronous position.

6. In a servomotor control for positioning a controlled object in accordance with the position of a controlling object in response to signal voltages, the combination comprising means for providing a measure of the voltage applied to said motor, and means for providing a measure of the current drawn by said motor due to the changes in motor impedance upon changes in the operational speed thereof, both of said means forming feedback circuits in series with the signal voltages to damp the oscillations of said motor about the synchronous position, said first means comprising an impedance in parallel with said motor and said second means comprising an impedance in series with said motor.

7. In a servomotor control for positioning a controlled object in accordance with the position of a controlling object in response to signal voltages, the combination comprising means for providing a measure of the voltage applied to said motor, and means for providing a measure of the current drawn by said motor due to the changes in motor impedance upon changes in the operational speed thereof, both of said means forming feedback circuits in series with the signal voltages to damp the oscillations of said motor about the synchronous position, said first means comprising a transformer having a primary winding connected in parallel with said motor and a secondary winding in series with the signal voltages, and said second means comprising an inductive impedance in series with said motor and said signal voltages.

8. In a servomotor control for positioning a controlled object in accordance with the position of a controlling object in response to signal voltages, the combination comprising means for providing a measure of the voltage applied to said motor, and means for providing a measure of the current drawn by said motor due to the changes in motor impedance upon changes in the operational speed thereof, both of said means forming feedback circuits in series with the signal voltages to damp the oscillations of said motor about the synchronous position, said first means comprising an impedance in parallel with said motor and said second circuit comprising an impedance in series with said motor; the voltage drop across both said impedances being equal under stall condition of said motor, and means for deriving a voltage proportional to the difference in the two voltage drops upon operation of said motor in response to the signal voltages, said differential voltage being added to the signal voltages to damp the oscillations of said motor about the synchronous position.

9. In a servomotor control for positioning a controlled object in accordance with the position of a controlling object in response to signal voltages, the combination comprising means for providing a measure of the voltage applied to said motor, and means for providing a measure of the current drawn by said motor due to the changes in motor impedance upon changes in the operational speed thereof, both of said means forming feedback circuits in series with the signal voltages to damp the oscillations of said motor about the synchronous position, said first means comprising a transformer having a primary winding connected in parallel with said motor and a secondary winding in series with the signal voltages, said second means comprising an inductive impedance in series with said motor and said signal voltages; the voltage drop across the secondary winding and the inductive impedance being equal under stall condition of said motor, and means for driving a speed voltage proportional to the difference in the two voltage drops upon operation of said motor in response to the signal voltages, said speed voltage being in series with the signal voltages to damp the oscillations of the motor about the synchronous position.

JOEL D. PETERSON.

REFERENCES CITED

The following references are of record in the file of this patent:

UNITED STATES PATENTS

| Number | Name | Date |
|---|---|---|
| 2,025,749 | Hubbard | Dec. 31, 1935 |
| 2,263,479 | Harrison | Nov. 18, 1941 |
| 2,363,342 | Lesnick | Nov. 21, 1944 |
| 2,429,257 | Bond | Oct. 21, 1947 |